(12) United States Patent
Alriksson et al.

(10) Patent No.: US 12,563,537 B2
(45) Date of Patent: Feb. 24, 2026

(54) WIRELESS DEVICE BANDWIDTH PART SWITCHING DURING A RANDOM ACCESS CHANNEL (RACH) PROCEDURE

(71) Applicant: Telefonaktiebolaget LM Ericsson (publ), Stockholm (SE)

(72) Inventors: Peter Alriksson, Hörby (SE); Min Wang, Luleå (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 324 days.

(21) Appl. No.: 18/042,694

(22) PCT Filed: Aug. 27, 2021

(86) PCT No.: PCT/EP2021/073743
§ 371 (c)(1),
(2) Date: Feb. 23, 2023

(87) PCT Pub. No.: WO2022/043497
PCT Pub. Date: Mar. 3, 2022

(65) Prior Publication Data
US 2023/0337201 A1 Oct. 19, 2023

Related U.S. Application Data

(60) Provisional application No. 63/071,097, filed on Aug. 27, 2020.

(51) Int. Cl.
*H04W 72/0453* (2023.01)
*H04W 74/08* (2024.01)
*H04W 74/0833* (2024.01)

(52) U.S. Cl.
CPC ... *H04W 72/0453* (2013.01); *H04W 74/0833* (2013.01)

(58) Field of Classification Search
CPC ......... H04W 74/0833; H04W 72/0453; H04W 72/02
See application file for complete search history.

(56) References Cited

U.S. PATENT DOCUMENTS 12,052,760 B2 * 7/2024 Jeon .................. H04W 74/0833
12,058,772 B2 * 8/2024 Zhou .................... H04L 5/0053
(Continued)

FOREIGN PATENT DOCUMENTS

EP 3681239 A1 7/2020

OTHER PUBLICATIONS

International Search Report and Written Opinion dated Jan. 4, 2022 for International Patent Application No. PCT/EP2021/073743 filed Aug. 27, 2021, consisting of 14-pages.
(Continued)

*Primary Examiner* — Brian D Nguyen
(74) *Attorney, Agent, or Firm* — Weisberg I.P. Law, P.A.

(57) ABSTRACT

A method, system and apparatus are disclosed. In one or more embodiments, a wireless device is provided. The wireless device includes processing circuitry configured to select one of a first bandwidth part, BWP, and a second BWP based on at least one predefined criterion where the first BWP is associated with configured first physical random access channel, PRACH, resources and a second BWP is associated with configured second PRACH resources different from the configured first PRACH resources, and implement the selected one of the first BWP and second BWP for a random access procedure.

15 Claims, 7 Drawing Sheets

BEGIN

Configure physical random access channel, PRACH, resources for a first bandwidth part, BWP, having a first subcarrier spacing and a second BWP having a second subcarrier spacing different from the first subcarrier spacing
S134

Indicate the first BWP and second BWP to the wireless device for selection by the wireless device
S136

END

(56)    References Cited

U.S. PATENT DOCUMENTS

| 12,074,711 | B2 * | 8/2024 | Cirik | ...................... | H04L 1/1864 |
| 12,289,758 | B2 * | 4/2025 | Tooher | .............. | H04W 74/0808 |
| 2020/0245369 | A1 * | 7/2020 | Chen | ................ | H04W 36/0077 |
| 2023/0045501 | A1 * | 2/2023 | Kim | .................. | H04W 72/1263 |
| 2023/0224876 | A1 * | 7/2023 | Yi | ......................... | H04W 76/27 |
| | | | | | 370/329 |
| 2023/0232387 | A1 * | 7/2023 | Yi | ..................... | H04W 72/0457 |
| | | | | | 370/329 |
| 2023/0239128 | A1 * | 7/2023 | Abotabl | ............ | H04W 72/0453 |
| | | | | | 370/280 |

OTHER PUBLICATIONS

3GPP TSG RAN Meeting #86 RP-193259 (revision of RP-193258); Title: New SID: Study on supporting NR from 52.6GHz to 71 GHz; Agenda Item: 9.1.1; Source: Intel Corporation; Document for: Approval; Date and Location: Dec. 9-12, 2019, Sitges, Spain, consisting of 3-pages.
3GPP TS 38.104 V16.2.0; 3rd Generation Partnership Project: Technical Specification Group Radio Access Network; NR; Base Station (BS) radio transmission and reception (Release 16); Dec. 2019, consisting of 239-pages.

* cited by examiner

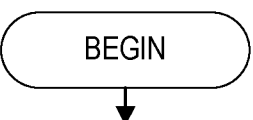

BEGIN

Configure physical random access channel, PRACH, resources for a first bandwidth part, BWP, having a first subcarrier spacing and a second BWP having a second subcarrier spacing different from the first subcarrier spacing
<u>S134</u>

Indicate the first BWP and second BWP to the wireless device for selection by the wireless device
<u>S136</u>

END

FIG. 8

BEGIN

Monitor for a random access procedure message on a first bandwidth part, BWP, and a second BWP, the first BWP being associated with configured first physical random access channel, PRACH, resources and on a second BWP being associated with configured second PRACH resources different from the configured first PRACH resources
<u>S138</u>

END

FIG. 9

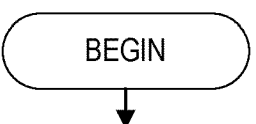

BEGIN

Receive an indication of configured physical random access channel, PRACH, resources for a first bandwidth part, BWP, having a first subcarrier spacing and a second BWP having a second subcarrier spacing different from the first subcarrier spacing
S140

Determine one of the first BWP and second BWP to implement for a random access procedure based on at least one predefined criterion
S142

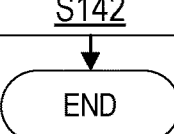

END

FIG. 10

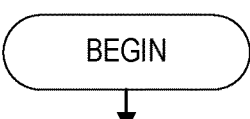

BEGIN

Select one of a first bandwidth part, BWP, and a second BWP based on at least one predefined criterion where the first BWP is associated with configured first physical random access channel, PRACH, resources and on a second BWP being associated with configured second PRACH resources different from the configured first PRACH resources
S144

Implement the selected one of the first BWP and second BWP for a random access procedure
S146

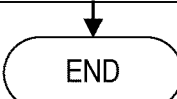

END

WIRELESS DEVICE BANDWIDTH PART SWITCHING DURING A RANDOM ACCESS CHANNEL (RACH) PROCEDURE

CROSS-REFERENCE TO RELATED APPLICATIONS

This application is a Submission Under 35 U.S.C. § 371 for U.S. National Stage Patent Application of International Application No.: PCT/EP2021/073743, filed Aug. 27, 2021 entitled "WIRELESS DEVICE BANDWIDTH PART SWITCHING DURING A RANDOM ACCESS CHANNEL (RACH) PROCEDURE," which claims priority to U.S. Provisional Application No. 63/071,097, filed Aug. 27, 2020, entitled "WIRELESS DEVICE BANDWIDTH PART SWITCHING DURING RACH PROCEDURE," the entireties of both of which are incorporated herein by reference.

FIELD

The present disclosure relates to wireless communications, and in particular, to Bandwidth Part (BWP) switching during a random access procedure.

BACKGROUND

3rd Generation Partnership Project (3GPP) New Radio (NR, also referred to as 5th Generation (5G)) operation in mm-wave bands Mobile broadband continues to drive the demands for higher overall traffic capacity and higher achievable end-user data rates in the wireless access network. In particular, several future scenarios may require data rates of up to 10 Gbps in local areas. These demands for very high system capacity and very high end-user date rates may be met by networks with distances between access nodes ranging from a few meters (m) in indoor deployments up to roughly 50 m in outdoor deployments, i.e., with an infrastructure density considerably higher than the most dense existing networks. The wide transmission bandwidths needed to provide data rates up to 10 Gbps and above can likely only be obtained from spectrum allocations in the millimeter-wave band. High-gain beamforming, typically realized with array antennas, can be used to mitigate the increased pathloss at higher frequencies. These networks are referred to as NR systems in the following.

NR supports a diverse set of use cases and a diverse set of deployment scenarios. The later includes deployment at both low frequencies (100s of MHz), and very high frequencies (mm waves in the tens of GHz). Two operation frequency ranges are defined in NR Release (Rel)-15: FR1 from 410 MHz to 7125 MHz and FR2 from 24.250 GHz to 52.6 GHz. Third Generation Partnership Project (3GPP) Radio Access Network (RAN) is working on a study item for 3GPP NR Rel-17 for supporting NR operation from 52.6 GHz to 71 GHz, where this study item includes the following objectives:

Study of required changes to NR using existing DL/UL NR waveform to support operation between 52.6 GHz and 71 GHz Study of applicable numerology including subcarrier spacing, channel bandwidth (BW) (including maximum BW), and their impact to FR2 physical layer design to support system functionality considering practical RF impairments [RAN1, RAN4].

Identify potential critical problems to physical signal/channels, if any [RAN1].

Study of channel access mechanism, considering potential interference to/from other nodes, assuming beam-based operation, in order to comply with the regulatory requirements applicable to unlicensed spectrum for frequencies between 52.6 GHz and 71 GHz [RAN1].

Note: potential interference impact, if identified, may require interference mitigation solutions as part of channel access mechanism.

NR Frame Structure

Similar to Long Term Evolution (LTE), NR uses OFDM (Orthogonal Frequency Division Multiplexing) in the downlink (i.e., from a network node, gNB, eNB, or base station, to a wireless device also referred to as user equipment or UE). The basic NR physical resource over an antenna port can thus be seen as a time-frequency grid as illustrated in FIG. 1, where a resource block (RB) in a 14-symbol slot is shown. A resource block corresponds to 12 contiguous subcarriers in the frequency domain. Resource blocks are numbered in the frequency domain, starting with 0 from one end of the system bandwidth. Each resource element corresponds to one OFDM subcarrier during one OFDM symbol interval.

Different subcarrier spacing values are supported in NR. The supported subcarrier spacing values (as may be defined by different numerologies) are given by $\Delta f=(15\times2^\mu)$ kHz where $\mu\in(0,1,2,3,4)$. $\Delta f=15$ kHz is the basic (or reference) subcarrier spacing that is also used in LTE.

In the time domain, downlink and uplink transmissions in NR may be organized into equally-sized subframes of 1 ms each similar to LTE. A subframe is further divided into multiple slots of equal duration. The slot length for subcarrier spacing $\Delta f=(15\times2^\mu)$ kHz is $\frac{1}{2}^\mu$ ms. There is only one slot per subframe for $\Delta f=15$ kHz and a slot consists of 14 OFDM symbols.

Downlink transmissions are dynamically scheduled, i.e., in each slot the network node (e.g., gNB) transmits downlink control information (DCI) about which wireless device data is to be transmitted to and which resource blocks in the current downlink slot the data is transmitted on. This control information is typically transmitted in the first one or two OFDM symbols in each slot in NR. The control information is carried on the Physical Control Channel (PDCCH) and data is carried on the Physical Downlink Shared Channel (PDSCH). A wireless device first detects and decodes PDCCH and if a PDCCH is decoded successfully, it then decodes the corresponding PDSCH based on the downlink assignment provided by decoded control information in the PDCCH.

In addition to PDCCH and PDSCH, there are also other channels and reference signals transmitted in the downlink, including synchronization signal block (SSB), channel state information-reference signal (CSI-RS), etc.

Uplink data transmissions, carried on Physical Uplink Shared Channel (PUSCH), are also dynamically scheduled by the network node by transmitting a DCI where the DCI (which is transmitted in the DL region) indicates a scheduling offset so that the PUSCH is transmitted in a slot in the UL region.

Subcarrier Spacing

To support network deployment in a wide-range of frequency bands for a variety of application scenarios, NR supports a flexible numerology with a range of subcarrier spacings, based on a scaling of a baseline subcarrier spacing of 15 kHz.

In particular, subcarrier spacing for SSB in a carrier is specified by the synchronization raster per frequency band as defined in wireless communication standards such as in 3GPP Technical Specification 38.104v16.2.0., Table 5.4.3.3-1 and Table 5.4.3.3-2). After the acquisition of SSB, the subCarrierSpacingCommon field in Master Information Block (MIB) indicates the subcarrier spacing for System Information Block 1 (SIB1), Msg.2/4 for initial access, paging and broadcast SI-messages. SIB1 further indicates the subcarrier spacing for channel and reference signals in the initial Uplink (UL) Bandwidth Part (BWP), while for the initial Downlink (DL) BWP the subcarrier spacing should be the same value as the field subCarrierSpacingCommon in MIB. For frequency range 1 (FR1) operation, the subcarrier spacing can be set to either 15 or 30 kHz. For frequency range 2 (FR2) operation, the subcarrier spacing can be set to either 60 or 120 kHz. Besides the initial DL/UL BWP, wireless devices may be further configured with other BWPs for each one of which subcarrier spacing is specified as part of the BWP configuration.

In general, in NR, all channels and reference signals in a BWP use the subcarrier spacing specified by the BWP configuration unless explicitly configured elsewhere. The system can only change the subcarrier spacing of signals or channels via changing the active BWP. As per NR Rel-15 and Rel-16, the exceptional channels and reference signal that adopt different subcarrier spacing than the one for the associated BWP are SSB in DL and PRACH in UL. SSB may adopt a subcarrier spacing that is different for the other channel and reference signal in the initial DL BWP. The subcarrier spacing for PRACH may be specified separately by the field RACH-ConfigCommon::msg1-SubcarrierSpacing in the initial UL BWP configuration.

Technical Challenges for NR Operation in Mm-Wave Frequency

Frequencies above 52.6 GHz are faced with more difficult challenges, such as higher phase noise, larger propagation loss due to high atmospheric absorption, lower power amplifier efficiency, and strong power spectral density regulatory requirements in unlicensed bands, compared to lower frequency bands.

Phase noise in a radio equipment may come from the time domain instability of the local oscillator. As a result of phase noise, the received signal suffers from random time varying phase errors. Generally, the phase-noise variance grows with the square of carrier frequency while it is inversely proportional to the power consumption. In the high frequency range above 52.6 GHz, phase noise becomes one of the major design challenges especially for multi-carrier waveform such as OFDM with higher order modulation.

As the operating frequency of wireless networks increases and moves to millimeter wave territory, data transmission between network nodes suffers from high propagation loss, which is proportional to the square of the carrier frequency. Moreover, millimeter wave signals also suffer from high oxygen absorption, high penetration loss and a variety of blockage problems. On the other hand, with the wavelength as small as less than a centi-meter, it becomes possible to pack a large amount (tens, hundreds or even thousands) of antenna elements into a single antenna array with a compact formfactor, which can be widely adopted in network equipment such as network nodes and user devices such as wireless devices. Such antenna arrays/panels can generate narrow beams with high beam forming gain to compensate for the high path loss in mm-wave communications, as well as providing highly directional transmission and reception pattern. As a consequence, directional transmission and reception are the distinguishing characteristics for wireless networks in mm-wave bands.

3GPP RAN is conducting a study to investigate the feasibility of re-using the existing OFDM and DFT-s-OFDM waveforms, which are used in NR for the frequency ranges of FR1 and FR2, for the frequency range above 52.6 GHz. Extending the existing NR waveforms to the higher frequency bands can leverage the current physical channel and signal design and the signaling mechanism in NR to the largest extent and reduce the standardization and implementation cost significantly. It can also help network nodes and wireless devices from the technical complexity of supporting multiple waveforms.

On the other hand, it is the common understanding that multi-carrier waveforms such as OFDM and DFT-s-OFDM are more sensitive to phase noise compared to single-carrier waveforms, which makes it very difficult in practice to achieve good link performance with high order modulation (such as 16QAM and above) in high frequency bands. This phase noise sensitivity problem can be addressed by a proper choice of sub-carrier spacing. Generally speaking, larger OFDM subcarrier spacing provides better robustness against phase noise. The existing NR specification supports OFDM subcarrier spacing up to 480 kHz (with $\mu=4$). To combat the high phase noise and to address large addressable bandwidths in high frequency bands, it may be beneficial to increase the subcarrier spacing up to 960 kHz. Furthermore, the effect of Doppler increases with carrier frequency, which also motivates the adoption of larger subcarrier spacings. A higher subcarrier spacing allows a higher transmission bandwidth which can achieve higher peak throughput under favorable channel conditions.

However, adopting larger subcarrier spacing brings several drawbacks:

Larger subcarrier spacing in frequency domain implies shorter OFDM duration in time domain, and hence shorter cyclic prefix (CP). In LTE and NR systems, CP length is dimensioned to handle the maximum delay spread of the channel, which is directly related to the cell range. A shorter CP implies a smaller cell range that the system is able to support.

Larger subcarrier spacing expands the transmission signal bandwidth (assuming the same subcarrier allocation), which leads to more noise being captured in the receiver and hence reduces the Signal-to-Noise-Ratio (SNR), given the constraint on the transmission power imposed by regulation or by hardware limitation. A reduced SNR not only degrades the link performance but also consumes more of the link budget and further reduces the cell range.

Larger subcarrier spacing corresponds to shorter OFDM symbol duration and shorter slot duration assuming the same NR frame structure is reused. For example, the slot duration is 125 us for SCS=120 kHz. With the SCS being increased to 960 kHz, the corresponding slot duration is reduced to 15.625 us. In NR, scheduling and time resource allocation is done on the basis of OFDM symbol and slot. Large subcarrier spacing corresponds to shorter OFDM symbol and slot duration. Such small scheduling and time resource allocation granularity becomes a significant challenge for the network nodes and wireless devices. Meanwhile, smaller scheduling and time resource allocation granularity also leads to much higher overhead.

Bandwidth Part Selection During Random Access

In some existing systems, the wireless device may attempt random access on the active BWP if there are PRACH resources configured. If no PRACH resources are configured on the active BWP, the wireless device may switch to the initial BWP and perform the RACH procedure using the initial BWP. If the RACH procedure is unsuccessful, the wireless device may start the radio link failure procedure.

As discussed above, operating on a BWP with high SCS has both advantages and disadvantages. For wireless devices in good coverage, using the higher SCS and thus higher BW is efficient, but for wireless devices in bad coverage using a BWP with lower SCS is better. In general, the network node may try to keep the wireless device on a BWP (and thus SCS) that suits its coverage conditions and traffic, but there could still be cases where this mechanism fails. That is, the wireless device still has a high SCS BWP active while being in poor coverage. In such conditions, it is quite likely that the wireless device needs to perform a random-access procedure, e.g., as part of a beam failure recovery procedure. Using the existing 3GPP Rel-16 procedure, the wireless device would attempt RACH on the active BWP with high SCS. This procedure has a high risk of failing because the wireless device is in poor coverage and using a high SCS BWP. If the RACH procedure fails, the wireless device may trigger the radio link failure (RLF) procedure which can cause considerable interruptions in the communication.

An alternative would be to not configure any PRACH resources on the high SCS BWP, but then the wireless device would switch to the low SCS BWP also when in good coverage. For example, to perform a RACH procedure to reacquire UL timing.

Thus, in existing systems, BWP switching during the RACH procedure suffers from various issues.

SUMMARY

Some embodiments advantageously provide methods, systems, and apparatuses for BWP switching during a random access procedure.

In one or more embodiments, methods for wireless device BWP switching during and before the random-access procedure are provided. One or more embodiments allow PRACH resources to be configured for both high and low SCS BWPs, while preventing unnecessary radio link failures due to failed random access. This allows wireless devices in good channel conditions (i.e., channel conditions meeting a predefined criterion or criteria) to use high SCS for the RACH procedure while still allowing wireless devices with poor channel conditions (i.e., channel conditions not meeting a predefined criterion or criteria) to use a lower SCS for the random-access procedure.

According to one aspect of the disclosure, a wireless device is provided. The wireless device includes processing circuitry configured to select one of a first bandwidth part, BWP, and a second BWP based on at least one predefined criterion where the first BWP is associated with configured first physical random access channel, PRACH, resources and a second BWP is associated with configured second PRACH resources different from the configured first PRACH resources. The processing circuitry is further configured to implement the selected one of the first BWP and second BWP for a random access procedure.

According to one or more embodiments of this aspect, the first BWP is associated with a first configuration and the second BWP is associated with a second configuration that is at least partially different from the first configuration. According to one or more embodiments of this aspect, the first configuration includes a first subcarrier spacing, SCS, and the second configuration includes a second SCS different from the first SCS. According to one or more embodiments of this aspect, the first configuration is configured to provide higher performance than the second configuration when used during a first channel condition where the second configuration is configured to provide higher performance than the first configuration when used during a second channel condition different from the first channel condition.

According to one or more embodiments of this aspect, the at least one predefined criterion includes determining whether an unsuccessful random access procedure occurred. According to one or more embodiments of this aspect, the processing circuitry is further configured to switch from one of the first BWP and the second BWP to the selected one of the first BWP and the second BWP to reinitiate the random access procedure after the unsuccessful random access procedure. According to one or more embodiments of this aspect, the one of the first BWP and the second BWP is an active BWP where the selected one of the first BWP and the second BWP to reinitiate the random access procedure is one of a fallback BWP.

According to one or more embodiments of this aspect, the selected one of the first BWP and the second BWP is an initial BWP associated with initiation of the random access procedure for initial cellular access with a network node. According to one or more embodiments of this aspect, the at least one predefined criterion is associated with one of a counter and threshold that trigger the selection when the at least one predefined criterion is met. According to one or more embodiments of this aspect, the threshold is a received signal received power, RSRP, threshold. According to one or more embodiments of this aspect, the processing circuitry is further configured to measure downlink signals associated with one of the first BWP and the second BWP, the selection being based at least on the measured downlink signals.

According to another aspect of the disclosure, a method implemented by a wireless device is provided. One of a first bandwidth part, BWP, and a second BWP is selected based on at least one predefined criterion where the first BWP is associated with configured first physical random access channel, PRACH, resources and a second BWP is associated with configured second PRACH resources different from the configured first PRACH resources. The selected one of the first BWP and second BWP for a random access procedure is implemented.

According to one or more embodiments of this aspect, the first BWP is associated with a first configuration and the second BWP is associated with a second configuration that is at least partially different from the first configuration. According to one or more embodiments of this aspect, the first configuration includes a first subcarrier spacing, SCS, and the second configuration includes a second SCS different from the first SCS. According to one or more embodiments of this aspect, the first configuration is configured to provide higher performance than the second configuration when used during a first channel condition where the second configuration is configured to provide higher performance than the first configuration when used during a second channel condition different from the first channel condition.

According to one or more embodiments of this aspect, the at least one predefined criterion includes determining whether an unsuccessful random access procedure occurred. According to one or more embodiments of this aspect, switching is performed from one of the first BWP and the second BWP to the selected one of the first BWP and the second BWP to reinitiate the random access procedure after the unsuccessful random access procedure. According to one or more embodiments of this aspect, the one of the first BWP and the second BWP is an active BWP where the selected one of the first BWP and the second BWP to reinitiate the random access procedure is one of a fallback BWP.

According to one or more embodiments of this aspect, the selected one of the first BWP and the second BWP is an initial BWP associated with initiation of the random access procedure for initial cellular access with a network node. According to one or more embodiments of this aspect, the at least one predefined criterion is associated with one of a counter and threshold that trigger the selection when the at least one predefined criterion is met. According to one or more embodiments of this aspect, the threshold is a received signal received power, RSRP, threshold. According to one or more embodiments of this aspect, downlink signals associated with one of the first BWP and the second BWP are measured where the selection is based at least on the measured downlink signals.

According to another aspect of the disclosure, a network node is provided. The network node includes processing circuitry configured to monitor for a random access procedure message on a first bandwidth part, BWP, and a second BWP where the first BWP is associated with configured first physical random access channel, PRACH, resources and a second BWP is associated with configured second PRACH resources different from the configured first PRACH resources.

According to one or more embodiments of this aspect, the first BWP is associated with a first configuration and the second BWP is associated with a second configuration that is at least partially different from the first configuration. According to one or more embodiments of this aspect, the first configuration includes a first subcarrier spacing, SCS, and the second configuration includes a second SCS different from the first SCS. According to one or more embodiments of this aspect, the first configuration is configured to provide higher performance than the second configuration when used during a first channel condition where the second configuration is configured to provide higher performance than the first configuration when used during a second channel condition different from the first channel condition.

According to one or more embodiments of this aspect, the processing circuitry is further configured to receive the random access procedure message via one of the first BWP and second BWP where the received random access procedure message is associated with a re-initiation of a random access procedure after an unsuccessful random access procedure. According to one or more embodiments of this aspect, the one of the first BWP and second BWP on which the random access procedure message is received corresponds to a fallback BWP. According to one or more embodiments of this aspect, the one of the first BWP and second BWP on which the random access procedure message is received corresponds to an initial BWP associated with an initiation of the random access procedure for initial cellular access with the network node. According to one or more embodiments of this aspect, the processing circuitry is further configured to configure the first PRACH resources associated with the first BWP and the second PRACH resources associated with the second BWP, and indicate the first BWP and second BWP to a wireless device for selection by the wireless device.

According to another aspect of the disclosure, a method implemented by a network node is provided. Monitoring is performed for a random access procedure message on a first bandwidth part, BWP, and a second BWP where the first BWP is associated with configured first physical random access channel, PRACH, resources and a second BWP is associated with configured second PRACH resources different from the configured first PRACH resources.

According to one or more embodiments of this aspect, the first BWP is associated with a first configuration and the second BWP is associated with a second configuration that is at least partially different from the first configuration. According to one or more embodiments of this aspect, the first configuration includes a first subcarrier spacing, SCS, and the second configuration includes a second SCS different from the first SCS. According to one or more embodiments of this aspect, the first configuration is configured to provide higher performance than the second configuration when used during a first channel condition where the second configuration is configured to provide higher performance than the first configuration when used during a second channel condition different from the first channel condition.

According to one or more embodiments of this aspect, the random access procedure message is received via one of the first BWP and second BWP where the received random access procedure message is associated with a re-initiation of a random access procedure after an unsuccessful random access procedure. According to one or more embodiments of this aspect, the one of the first BWP and second BWP on which the random access procedure message is received corresponds to a fallback BWP. According to one or more embodiments of this aspect, the one of the first BWP and second BWP on which the random access procedure message is received corresponds to an initial BWP associated with an initiation of the random access procedure for initial cellular access with the network node. According to one or more embodiments of this aspect, the first PRACH resources associated with the first BWP and the second PRACH resources associated with the second BWP are configured, and the first BWP and second BWP are indicated to a wireless device for selection by the wireless device.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 8 is a flowchart of an example process in a network node according to some embodiments of the present disclosure;

FIG. 9 is a flowchart of another example process in a network node according to some embodiments of the present disclosure;

FIG. 10 is a flowchart of an example process in a wireless device according to some embodiments of the present disclosure; and FIG. 11 is a flowchart of another example process in a wireless device according to some embodiments of the present disclosure.

DETAILED DESCRIPTION

Figure 1:
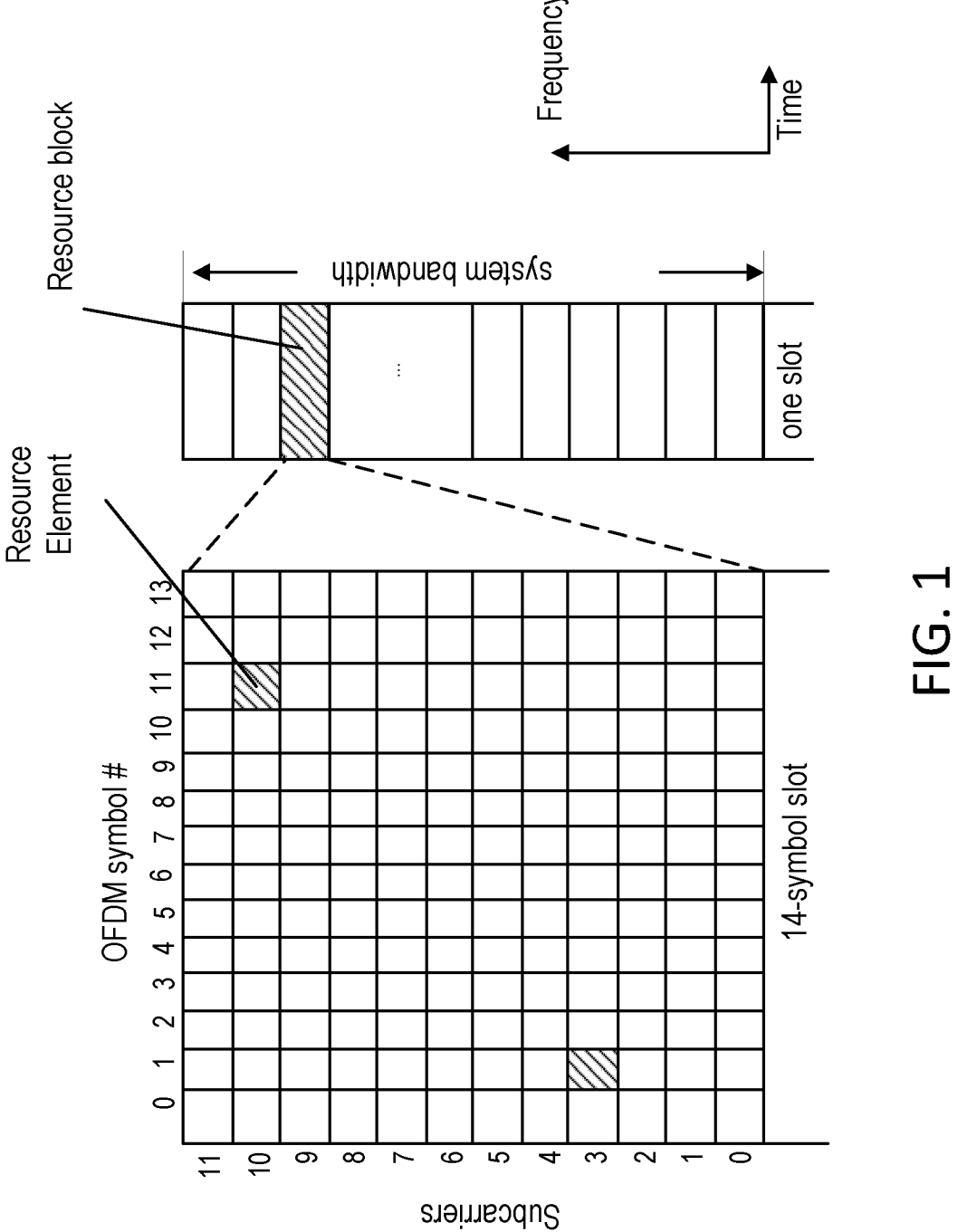
FIG. 1 is a NR physical resource grid.

Before describing in detail exemplary embodiments, it is noted that the embodiments reside primarily in combinations of apparatus components and processing steps related to BWP switching during a random access procedure. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Transmitting in downlink may pertain to transmission from the network or network node to the wireless device. Transmitting in uplink may pertain to transmission from the wireless device to the network or network node. Transmitting in sidelink may pertain to (direct) transmission from one wireless device to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 2:
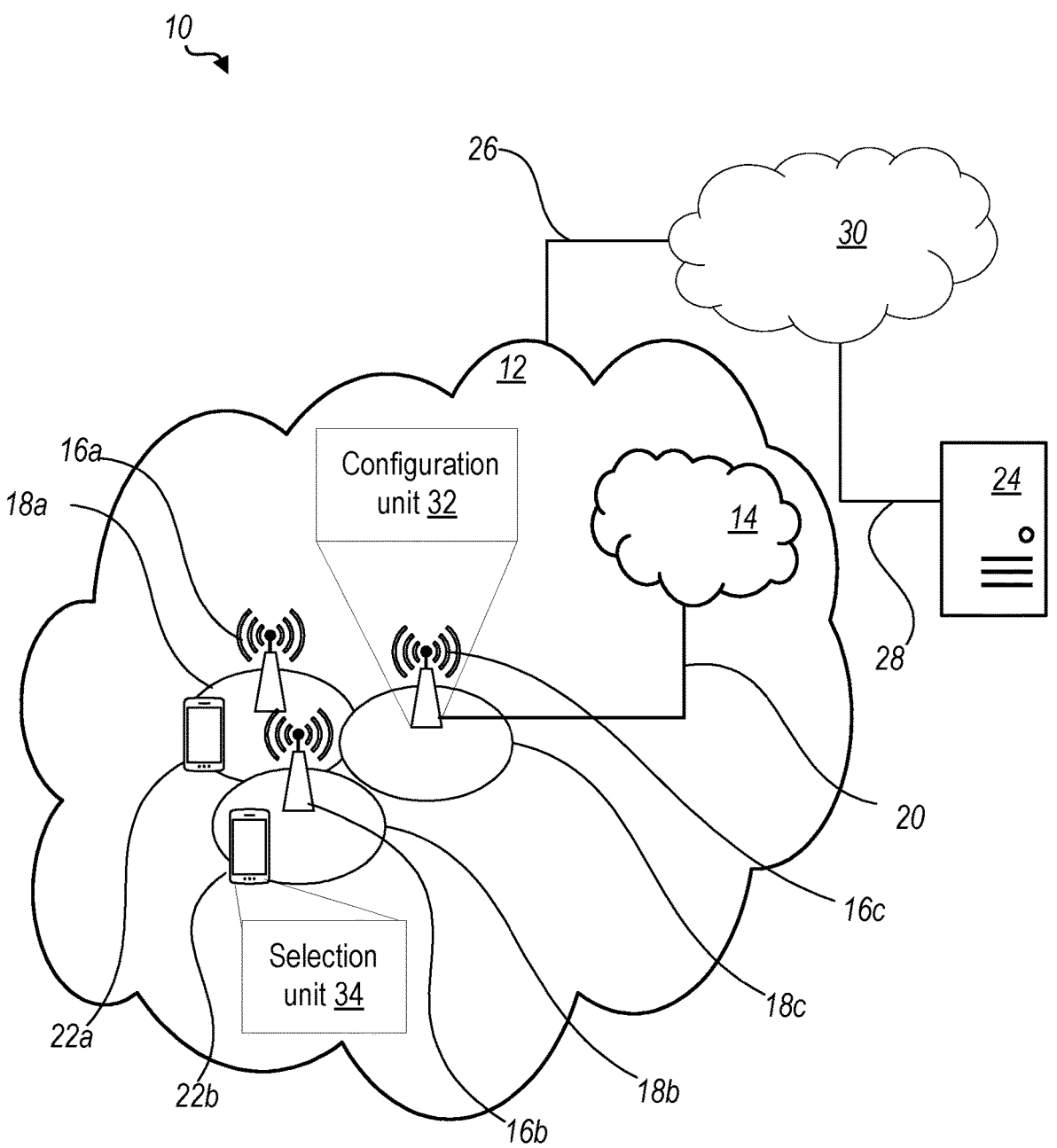
FIG. 2 is a schematic diagram of an example network architecture illustrating a communication system connected via an intermediate network to a host computer according to the principles in the present disclosure.

Embodiments provide BWP switching during a random access procedure. Referring again to the drawing figures, in which like elements are referred to by like reference numerals, there is shown in FIG. 2 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 2 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a configuration unit 32 which is configured to provide one or more network node 16 functions as described herein such as with respect to BWP switching during a random access procedure. A wireless device 22 is configured to include a selection unit 34 which is configured to provide one or more wireless device 22 functions as described herein such as with respect to BWP switching during a random access procedure.

Example implementations, in accordance with an embodiment, of the WD 22, network node 16 and host computer 24 discussed in the preceding paragraphs will now be described with reference to FIG. 3. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to store, determine, configure, forward, transmit, receive, relay, select, etc. information related to BWP switching during a random access procedure.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include configuration unit 32 configured to provide one or more network node 16 functions as described herein such as with respect to BWP switching during a random access procedure.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a selection unit 34 configured to perform one or more wireless device 22 functions as described herein such as with respect to BWP switching during a random access procedure.

Figure 3:
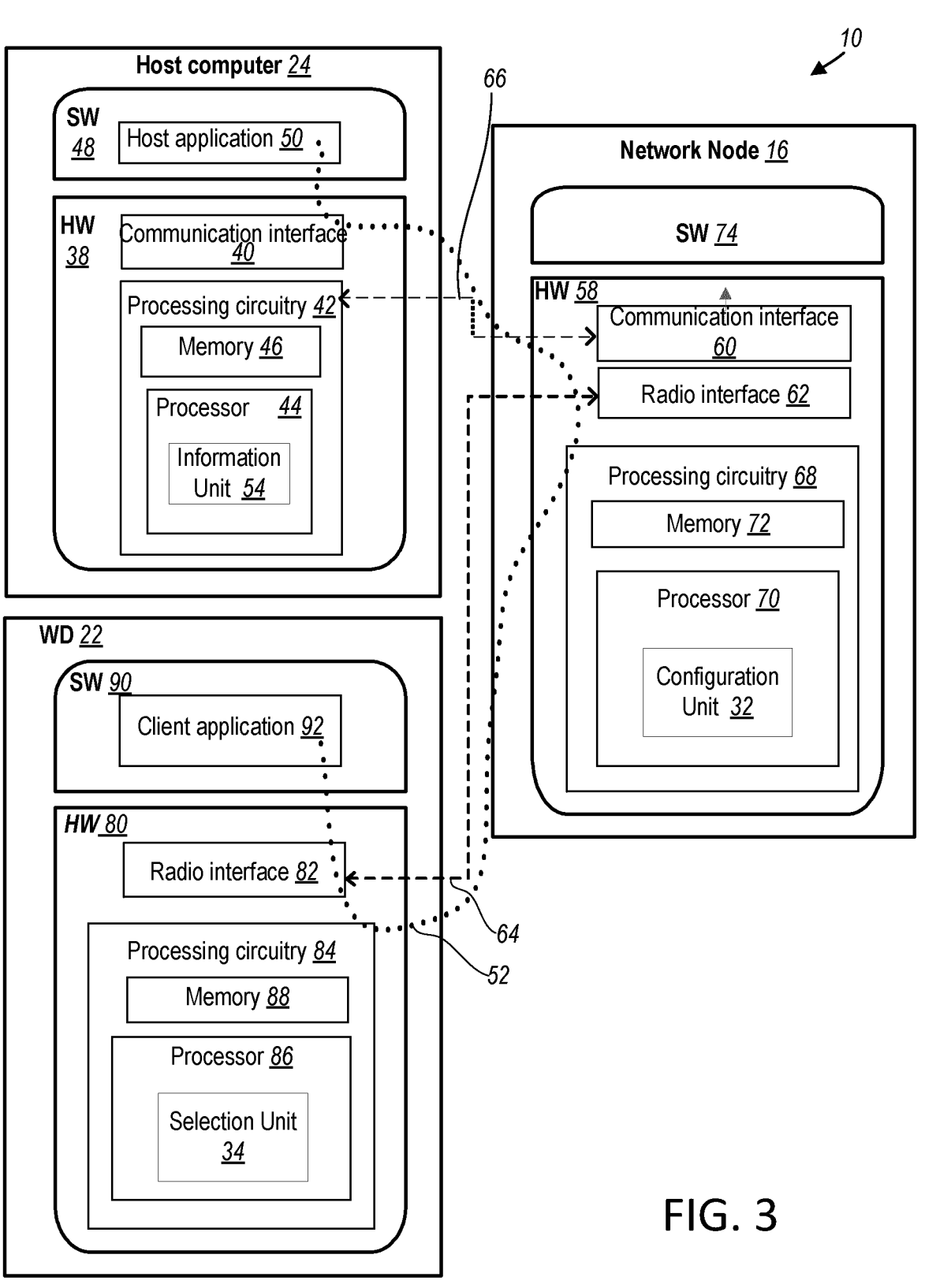
FIG. 3 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 3 and independently, the surrounding network topology may be that of FIG. 2.

In FIG. 3, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 2 and 3 show various "units" such as configuration unit 32, and selection unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 4, 5:
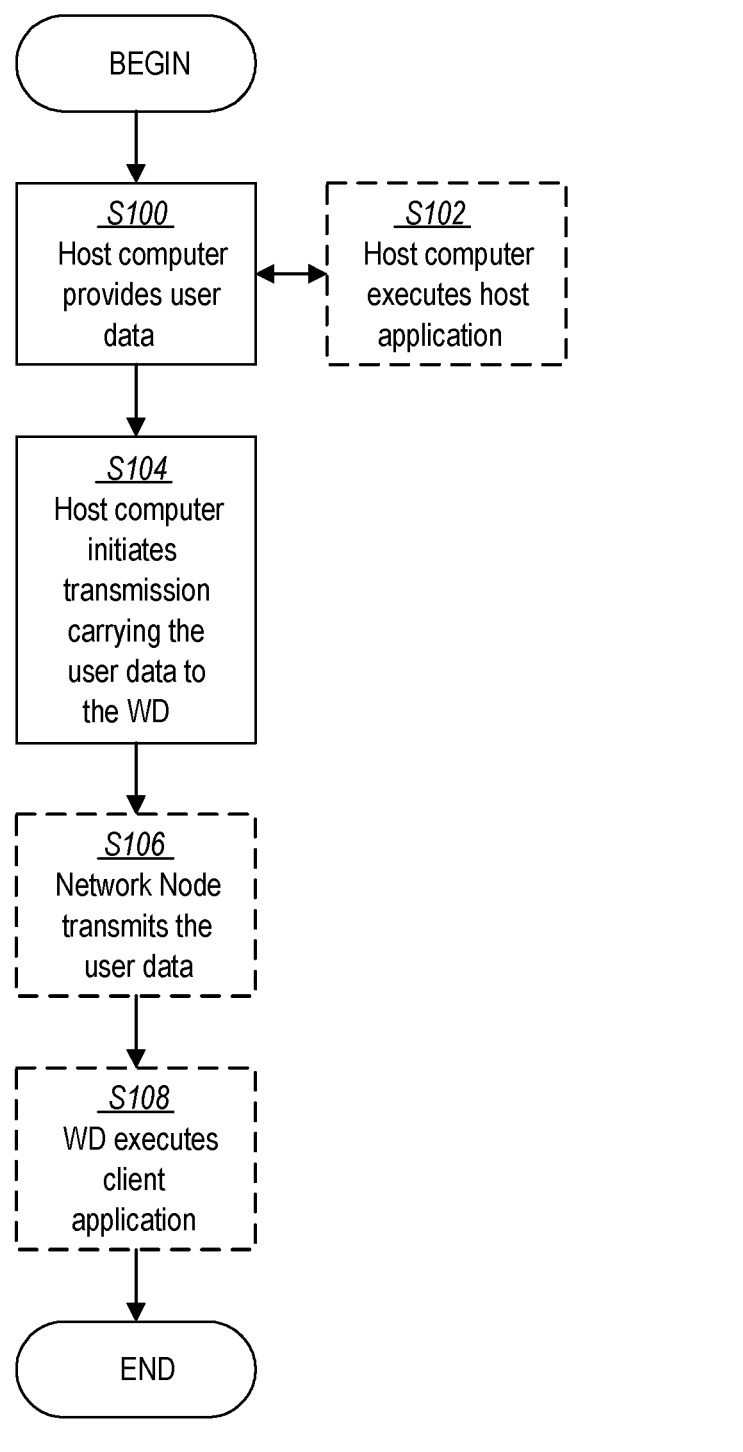
FIG. 4 is a flowchart illustrating example methods implemented in a communication system including a host computer, a network node and a wireless device for executing a client application at a wireless device according to some embodiments of the present disclosure.
FIG. 5 is a flowchart illustrating example methods implemented in a communication system including a host computer, a network node and a wireless device for receiving user data at a wireless device according to some embodiments of the present disclosure.

FIG. 4 is a flowchart illustrating an example method implemented in a communication system, such as, for example, the communication system of FIGS. 2 and 3, in accordance with one embodiment. The communication system may include a host computer 24, a network node 16 and a WD 22, which may be those described with reference to FIG. 3. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 5 is a flowchart illustrating an example method implemented in a communication system, such as, for example, the communication system of FIG. 2, in accordance with one embodiment. The communication system may include a host computer 24, a network node 16 and a WD 22, which may be those described with reference to FIGS. 2 and 3. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figure 6:
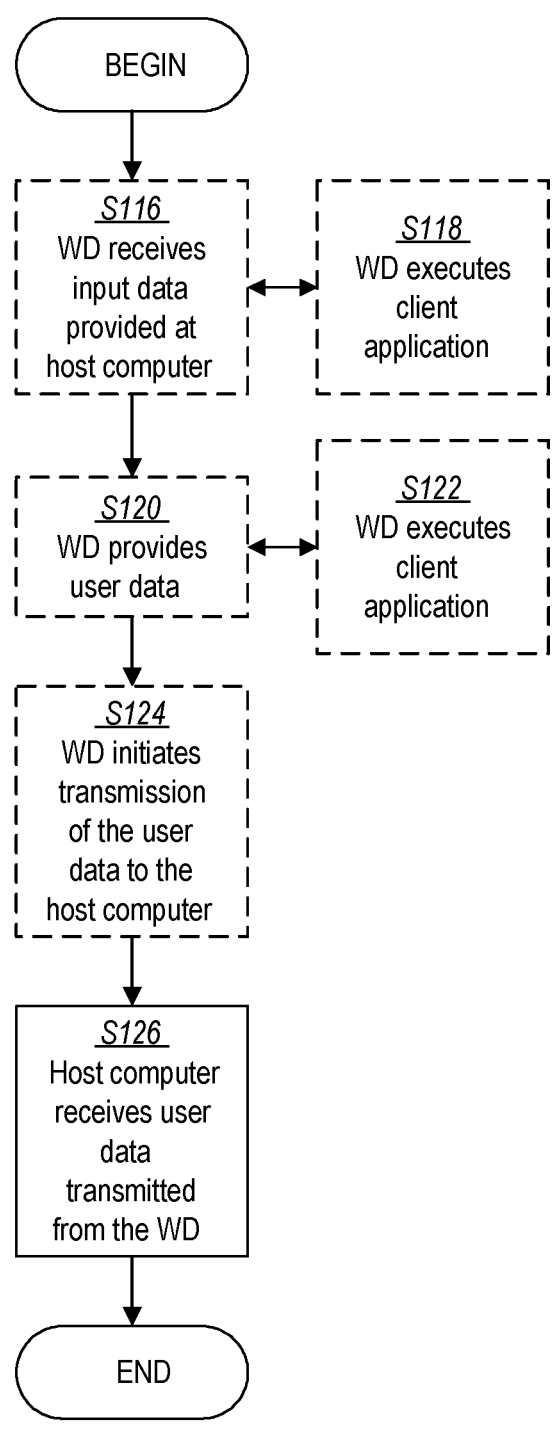
FIG. 6 is a flowchart illustrating example methods implemented in a communication system including a host computer, a network node and a wireless device for receiving user data from the wireless device at a host computer according to some embodiments of the present disclosure.

FIG. 6 is a flowchart illustrating an example method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

Figure 7:
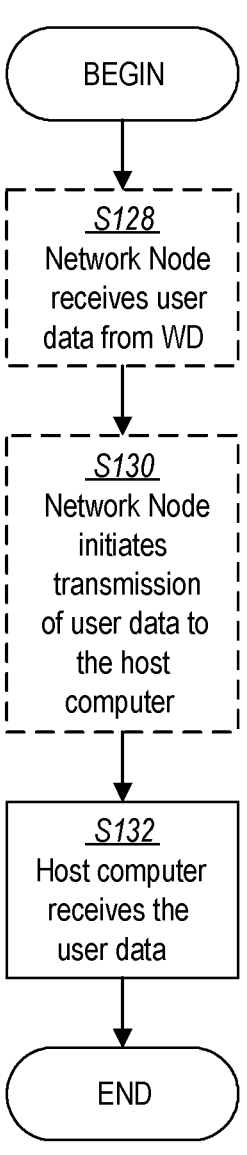
FIG. 7 is a flowchart illustrating example methods implemented in a communication system including a host computer, a network node and a wireless device for receiving user data at a host computer according to some embodiments of the present disclosure.

FIG. 7 is a flowchart illustrating an example method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

FIG. 8 is a flowchart of an example process in a network node 16 according to some embodiments of the present disclosure. One or more Blocks and/or functions performed by network node 16 may be performed by one or more elements of network node 16 such as by configuration unit 32 in processing circuitry 68, processor 70, radio interface 62, etc. In one or more embodiments, network node 16 is configured to configure (Block S134) physical random access channel, PRACH, resources for a first bandwidth part, BWP, having a first subcarrier spacing (which may be referred to as a first SCS BWP) and a second BWP having a second subcarrier spacing (which may be referred to as a second SCS BWP) different from the first subcarrier spacing, as described herein. In one or more embodiments, network node 16 is configured to indicate (Block S136) the first BWP and second BWP to the wireless device 22 for selection by the wireless device 22, as described herein. The selection by the wireless device 22 may correspond to a switch of a BWP by the wireless device 22 during a random access procedure or RACH procedure.

According to one or more embodiments, one of the first BWP and second BWP is configured to be selected based at least on a measured downlink signal, as described herein.

According to one or more embodiments, one of the first BWP and second SCS BWP is configured to be selected after an unsuccessful random access procedure.

FIG. 9 is a flowchart of another example process in a network node 16 according to some embodiments of the present disclosure. One or more Blocks and/or functions performed by network node 16 may be performed by one or more elements of network node 16 such as by configuration unit 32 in processing circuitry 68, processor 70, radio interface 62, etc. In one or more embodiments, network node 16 is configured to monitor (Block S138) for a random access procedure message on a first bandwidth part, BWP, and a second BWP where the first BWP is associated with configured first physical random access channel, PRACH, resources and a second BWP is associated with configured second PRACH resources different from the configured first PRACH resources, as described herein.

According to one or more embodiments, the first BWP is associated with a first configuration and the second BWP is associated with a second configuration that is at least partially different from the first configuration. According to one or more embodiments, the first configuration includes a first subcarrier spacing, SCS, and the second configuration includes a second SCS different from the first SCS. According to one or more embodiments, the first configuration is configured to provide higher performance than the second configuration when used during a first channel condition where the second configuration is configured to provide higher performance than the first configuration when used during a second channel condition different from the first channel condition.

According to one or more embodiments, the processing circuitry 68 is further configured to receive the random access procedure message via one of the first BWP and second BWP where the received random access procedure message is associated with a re-initiation of a random access procedure after an unsuccessful random access procedure. According to one or more embodiments, the one of the first BWP and second BWP on which the random access procedure message is received corresponds to a fallback BWP. According to one or more embodiments, the one of the first BWP and second BWP on which the random access procedure message is received corresponds to an initial BWP associated with an initiation of the random access procedure for initial cellular access with the network node. According to one or more embodiments, the processing circuitry 68 is further configured to configure the first PRACH resources associated with the first BWP and the second PRACH resources associated with the second BWP, and indicate the first BWP and second BWP to a wireless device for selection by the wireless device. FIG. 10 is a flowchart of an example process in a wireless device 22 according to some embodiments of the present disclosure. One or more Blocks and/or functions performed by wireless device 22 may be performed by one or more elements of wireless device 22 such as by selection unit 34 in processing circuitry 84, processor 86, radio interface 82, etc. In one or more embodiments, wireless device is configured to receive (Block S140) an indication of configured physical random access channel, PRACH, resources for a first bandwidth part, BWP, having a first subcarrier spacing and a second BWP having a second subcarrier spacing different from the first subcarrier spacing, as described herein. In one or more embodiments, wireless device is configured to determine (Block S142) one of the first BWP and second BWP to implement for a random access procedure based on at least one predefined criterion, as described herein. The implementation of a determined BWP may correspond and/or include a switch of a BWP by the wireless device 22 during a random access procedure or RACH procedure.

According to one or more embodiments, the predefined criterion being associated with one of: a failure with one of the first BWP and second BWP; and a channel measurement. According to one or more embodiments, the determination is performed before initiating the random access procedure.

FIG. 11 is a flowchart of another example process in a wireless device 22 according to some embodiments of the present disclosure. One or more Blocks and/or functions performed by wireless device 22 may be performed by one or more elements of wireless device 22 such as by selection unit 34 in processing circuitry 84, processor 86, radio interface 82, etc. In one or more embodiments, wireless device 22 configured to select (Block S144) one of a first bandwidth part, BWP, and a second BWP based on at least one predefined criterion where the first BWP is associated with configured first physical random access channel, PRACH, resources and a second BWP is associated with configured second PRACH resources different from the configured first PRACH resources, as described herein. In one or more embodiments, wireless device 22 is configured to implement (Block S146) the selected one of the first BWP and second BWP for a random access procedure, as described herein.

According to one or more embodiments, the first BWP is associated with a first configuration and the second BWP is associated with a second configuration that is at least partially different from the first configuration. According to one or more embodiments, the first configuration includes a first subcarrier spacing, SCS, and the second configuration includes a second SCS different from the first SCS. According to one or more embodiments, the first configuration is configured to provide higher performance than the second configuration when used during a first channel condition where the second configuration is configured to provide higher performance than the first configuration when used during a second channel condition different from the first channel condition.

According to one or more embodiments, the at least one predefined criterion includes determining whether an unsuccessful random access procedure occurred. According to one or more embodiments, the processing circuitry 84 is further configured to switch from one of the first BWP and the second BWP to the selected one of the first BWP and the second BWP to reinitiate the random access procedure after the unsuccessful random access procedure. According to one or more embodiments, the one of the first BWP and the second BWP is an active BWP where the selected one of the first BWP and the second BWP to reinitiate the random access procedure is one of a fallback BWP.

According to one or more embodiments, the selected one of the first BWP and the second BWP is an initial BWP associated with initiation of the random access procedure for initial cellular access with a network node 16. According to one or more embodiments, the at least one predefined criterion is associated with one of a counter and threshold that trigger the selection when the at least one predefined criterion is met. According to one or more embodiments, the threshold is a received signal received power, RSRP, threshold. According to one or more embodiments, the processing circuitry 84 is further configured to measure downlink signals associated with one of the first BWP and the second BWP, the selection being based at least on the measured downlink signals.

Having generally described arrangements for BWP switching during a random access procedure, details for these arrangements, functions and processes are provided as follows, and which may be implemented by the network node 16, wireless device 22 and/or host computer 24. One or more wireless device 22 functions described below may be performed by one or more of processing circuitry 84, processor 86, selection unit 34, radio interface 82, etc. One or more network node 16 functions described below may be performed by one or more of processing circuitry 68, processor 70, configuration unit 32, radio interface 62, etc.

Embodiments provide BWP switching during a random access procedure. As used below, the terminology FR2x (Frequency Range 2x) is generally used to reference the frequency range above 52.6 GHz, although it is contemplated that the term FR2x may refer to another range in accordance with the teachings of the disclosure. Further, the teachings described herein are not limited by the term FR2x, as other terms are interchangeably applicable. Some examples of SCS are provided herein that may be suitable for the 57-71 GHz range although other SCS could be more suitable for other systems or frequency ranges.

For NR operation in FR2x, using a relatively small subcarrier spacing (e.g., 120 kHz or 240 kHz) brings several advantages in terms of longer cyclic prefix, smaller transmission bandwidth and hence larger signal to noise ratio (SNR) in power limited scenarios, and larger slot and symbol duration to ease scheduling and reduce signaling overhead. On the other hand, a larger subcarrier spacing (e.g., 480 kHz or 960 kHz) provides robustness against high phase noise and Doppler, enabling high order modulation. A larger subcarrier spacing may correspond to reduced system latency and higher throughput, if channel conditions allow.

Because wireless devices 22 can move from good to bad channel conditions one option is to configure the wireless device 22 with two (or more) BWPs with different SCS. The wireless device 22 may always be configured with an initial BWP part both for DL and UL where for the sake of description, it is assumed herein that the initial BWP has the lowest SCS. Therefore, in addition to the initial BWP, the wireless device 22 is also configured with at least a higher SCS BWP.

The below embodiments are applicable to a wireless device 22 in radio resource control (RRC) connected/RRC inactive state. Since in existing wireless communication standards, it may be only a wireless device in RRC connected/RRC inactive state that is configured with multiple BWPs containing RACH resources. In future release of wireless communication standards, it is also possible that the wireless device in RRC IDLE may be configured with multiple BWPs containing RACH resources, where, in that case, the below embodiments are equally applicable.

Example 1: BWP Change After RACH Failure

In this group of embodiments, the BWP change is performed after an unsuccessful random-access procedure such as a first or initial random access procedure.

As described above, a 3GPP Rel-15/16 wireless device 22 may perform random access on the active (first) bandwidth part (first BWP) and may trigger a RLF procedure if the random access procedure fails. In this embodiment, instead of declaring RLF if the random-access procedure fails, the wireless device 22 is configured to switch to a second BWP (with lower SCS) and perform the random-access procedure on the second BWP instead of the first BWP. In general, the second BWP can be any other BWP, but typically using a BWP with a lower SCS will increase the likelihood that the random-access procedure succeeds.

In one or more embodiments, the second BWP can be any one of the initial BWP, a fallback BWP that the wireless device 22 is configured with or a BWP that is dynamically selected by the wireless device 22.

The failure condition to switch from the first BWP to the second BWP can either be the same as for 3GPP Rel-15/16 wireless device 22, i.e., PREAMBLE_TRANSMISSION_COUNTER>preambleTransMax or another new threshold/condition can be configured for the BWP switching which could be lower than preambleTransMax.

In one or more embodiments, the counter or threshold configured for the BWP switch could be configured as different values for different RACH events, RA priority classes, services with different QoS requirements, services with different priority levels. For a RA event with higher priority class (or lower latency requirement), a lower value can be configured in order to trigger a BWP switch faster. For services with higher priority levels (or lower latency requirements) which are being employed at the time of BWP switch, a lower value can be configured in order to trigger a BWP switch faster. While in other cases, a larger counter can be configured for BWP switch.

In one or more embodiments, all counters and timers related to the RACH procedure which has failed are reset after switching to another BWP.

In one or more embodiments, the power ramping counter is reset after the BWP switch and in another embodiment the power ramping counter is not reset. The wireless device 22 behavior can either be configured or fixed by wireless communication standard as based on the teachings herein.

Further, one or more embodiments can be generalized to more than two BWPs where each BWP has a fallback BWP configured, eventually arriving at the initial BWP.

Example 2: BWP Selection Before Initiating RACH

In this group of embodiments, the BWP selection is performed by, for example, wireless device 22 prior to initiating the random-access procedure.

As in existing systems, a PRACH resource is associated with a DL reference signal, either an SSB or a CSI-RS.

In one or more embodiments, the wireless device 22 selects the BWP based at least on the measured RSRP of associated DL signals. That is, if no associated DL signal has an RSRP above a threshold for the active (first) BWP, the wireless device 22 checks if any associated DL signal has an RSRP above a threshold for a second BWP. The threshold is configured per BWP and can either be a new threshold for the purpose of BWP selection or it can be a known threshold such as 3GPP Rel-15/Rel-16 thresholds rsrp-ThresholdSSB or rsrp-ThresholdCSI-RS for SSBs and CSI-RS respectively. In this embodiment, the RSRP threshold is defined for indicating the coverage level associated with each BWP, based on which the wireless device 22 selects a BWP fitting the wireless device 22's current coverage situation.

In one or more embodiments, one or more thresholds in terms of other metrics (such as CQI, throughput, bitrate, etc.) are configured for the wireless device 22 for selecting a BWP.

In one or more embodiments, for any of the above thresholds, the wireless device 22 may apply a single threshold or combined several thresholds together when deciding which BWP should be selected.

In one or more embodiments, the second BWP can either be the initial BWP, a fallback BWP that the wireless device 22 is configured with or a BWP that is dynamically selected by the wireless device 22.

The procedure can be generalized to more than two BWPs where each BWP has a fallback BWP configured, eventually arriving at the initial BWP.

Once the BWP is selected, the wireless device 22 initiates the random-access procedure. One or more embodiments in Example 2 can be combined with one or more embodiments of Example 1, so that if the random-access procedure fails the selected BWP, the wireless device 22 selects yet another BWP or BW (if available).

Therefore, in one or more embodiments, a wireless device 22 method for BWP selection as part of the random-access procedure is provided.

SOME EXAMPLES

Example A1. A network node 16 configured to communicate with a wireless device 22 (WD 22), the network node 16 configured to, and/or comprising a radio interface 62 and/or comprising processing circuitry 68 configured to:

configure physical random access channel, PRACH, resources for a first bandwidth part, BWP, having a first subcarrier spacing and a second BWP having a second subcarrier spacing different from the first subcarrier spacing; and indicate the first BWP and second BWP to the wireless device 22 for selection by the wireless device 22.

Example A2. The network node 16 of Example A1, wherein one of the first BWP and second BWP is configured to be selected based at least on a measured downlink signal.

Example A3. The network node 16 of Example A1, wherein one of the first BWP and second SCS BWP is configured to be selected after an unsuccessful random access procedure.

Example B1. A method implemented in a network node 16, the method comprising: configuring physical random access channel, PRACH, resources for a first bandwidth part, BWP, having a first subcarrier spacing and a second BWP having a second subcarrier spacing different from the first subcarrier spacing; and indicate the first BWP and second BWP to a wireless device 22 for selection by the wireless device 22.

Example B2. The method of Example B1, wherein one of the first BWP and second BWP is configured to be selected based at least on a measured downlink signal.

Example B3. The method of Example B1, wherein one of the first BWP and second SCS BWP is configured to be selected after an unsuccessful random access procedure.

Example C1. A wireless device 22 (WD 22) configured to communicate with a network node 16, the WD 22 configured to, and/or comprising a radio interface 62 and/or processing circuitry 68 configured to:

receive an indication of configured physical random access channel, PRACH, resources for a first bandwidth part, BWP, having a first subcarrier spacing and a second BWP having a second subcarrier spacing different from the first subcarrier spacing; and determine one of the first BWP and second BWP to implement for a random access procedure based on at least one predefined criterion.

Example C2. The WD 22 of Example C1, wherein the predefined criterion being associated with one of:

a failure with one of the first BWP and second BWP; and a channel measurement.

Example C3. The WD 22 of Example C1, wherein the determination is performed before initiating the random access procedure.

Example D1. A method implemented in a wireless device 22 (WD 22), the method comprising:

receiving an indication of configured physical random access channel, PRACH, resources for a first bandwidth part, BWP, having a first subcarrier spacing and a second BWP having a second subcarrier spacing different from the first subcarrier spacing; and determining one of the first BWP and second BWP to implement for a random access procedure based on at least one predefined criterion.

Example D2. The method of Example D1, wherein the predefined criterion being associated with one of:

a failure with one of the first BWP and second BWP; and a channel measurement.

Example D3. The method of Example D1, wherein the determination is performed before initiating the random access procedure.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
| --- | --- |
| DCI | Downlink Control Information |
| DFT | Discrete Fourier Transform |
| FDM | Frequency Division Multiplexing |
| LTE | Long Term Evolution |
| NR | New Radio |
| OFDM | Orthogonal Frequency Division Multiplexing |
| OS | OFDM Symbol |
| PA | Power Amplifier |
| PDCCH | Physical Downlink Control Channel |
| PDSCH | Physical Downlink Shared Channel |
| PRB | Physical Resource Block |
| PUCCH | Physical Uplink Control Channel |
| PUSCH | Physical Uplink Shared Channel |
| RAN | Radio Access Network |
| RB | Resource Block |
| SCS | Sub-Carrier Spacing |
| SSB | Synchronous Signal and PBCH |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A wireless device, comprising:

processing circuitry configured to:

select one of a first bandwidth part, BWP, and a second BWP based on at least one predefined criterion, the at least one predefined criterion including determining whether an unsuccessful random access procedure occurred, the first BWP being associated with configured first physical random access channel, PRACH, resources and the second BWP being associated with configured second PRACH resources different from the configured first PRACH resources;

switch from one of the first BWP and the second BWP to the selected one of the first BWP and the second BWP to reinitiate a random access procedure after the unsuccessful random access procedure, the one of the first BWP and the second BWP being an active BWP, the selected one of the first BWP and the second BWP to reinitiate the random access procedure being a fallback BWP; and implement the selected one of the first BWP and second BWP for the random access procedure.

2. A method implemented by a wireless device, the method comprising:

selecting one of a first bandwidth part, BWP, and a second BWP based on at least one predefined criterion, the at least one predefined criterion including determining whether an unsuccessful random access procedure occurred, the first BWP being associated with configured first physical random access channel, PRACH, resources and the second BWP being associated with configured second PRACH resources different from the configured first PRACH resources;

switching from one of the first BWP and the second BWP to the selected one of the first BWP and the second BWP to reinitiate a random access procedure after the unsuccessful random access procedure, the one of the first BWP and the second BWP being an active BWP, the selected one of the first BWP and the second BWP to reinitiate the random access procedure being a fallback BWP; and implementing the selected one of the first BWP and second BWP for the random access procedure.

3. The method of claim 2, wherein the first BWP is associated with a first configuration and the second BWP is associated with a second configuration that is at least partially different from the first configuration.

4. The method of claim 3, wherein the first configuration includes a first subcarrier spacing, SCS, and the second configuration includes a second SCS different from the first SCS.

5. The method of claim 4, wherein the first configuration is configured to provide higher performance than the second configuration when used during a first channel condition; and the second configuration is configured to provide higher performance than the first configuration when used during a second channel condition different from the first channel condition.

6. The method of claim 2, wherein the selected one of the first BWP and the second BWP is an initial BWP associated with initiation of the random access procedure for initial cellular access with a network node.

7. The method of claim 2, wherein the at least one predefined criterion is associated with one of a counter and threshold that trigger the selection when the at least one predefined criterion is met.

8. The method of claim 7, wherein the threshold is a received signal received power, RSRP, threshold.

9. The method of claim 2, further comprising measuring downlink signals associated with one of the first BWP and the second BWP, the selection being based at least on the measured downlink signals.

10. A network node, comprising:

processing circuitry configured to:

monitor for a random access procedure message on a first bandwidth part, BWP, and a second BWP, the first BWP being associated with configured first physical random access channel, PRACH, resources and the second BWP being associated with configured second PRACH resources different from the configured first PRACH resources; and receive the random access procedure message via one of the first BWP and the second BWP, the received random access procedure message being associated with a re-initiation of a random access procedure after an unsuccessful random access procedure, the one of the first BWP and the second BWP on which the random access procedure message is received corresponding to a fallback BWP.

11. A method implemented by a network node, the method comprising:

monitoring for a random access procedure message on a first bandwidth part, BWP, and a second BWP, the first BWP being associated with configured first physical random access channel, PRACH, resources and the second BWP being associated with configured second PRACH resources different from the configured first PRACH resources; and receiving the random access procedure message via one of the first BWP and the second BWP, the received random access procedure message being associated with a re-initiation of a random access procedure after an unsuccessful random access procedure, the one of the first BWP and the second BWP on which the random access procedure message is received corresponding to a fallback BWP.

12. The method of claim 11, wherein the first BWP is associated with a first configuration and the second BWP is associated with a second configuration that is at least partially different from the first configuration.

13. The method of claim 12, wherein the first configuration includes a first subcarrier spacing, SCS, and the second configuration includes a second SCS different from the first SCS.

14. The method of claim 13, wherein the first configuration is configured to provide higher performance than the second configuration when used during a first channel condition; and the second configuration is configured to provide higher performance than the first configuration when used during a second channel condition different from the first channel condition.

15. The method of claim 11, wherein the one of the first BWP and the second BWP on which the random access procedure message is received corresponds to an initial BWP associated with an initiation of the random access procedure for initial cellular access with the network node.

* * * * *